(12) United States Patent
Parvizi et al.

(10) Patent No.: US 12,472,162 B2
(45) Date of Patent: Nov. 18, 2025

(54) READY-TO-USE, TERMINALLY STERILE PACKAGING FOR SURGICAL ANTISEPTIC AND METHOD OF USE

(71) Applicant: CareFusion 213, LLC, San Diego, CA (US)

(72) Inventors: Javad Parvizi, Gladwyne, PA (US); Peter F. Sharkey, Villanova, PA (US); Craig J. Della Valle, Chicago, IL (US); David L. Kirschman, West Carrollton, OH (US); Harry G. Brittain, Milford, NJ (US); Mayank M. Parmar, Upper Darby, PA (US); Alan B. Miller, Jamison, PA (US)

(73) Assignee: CAREFUSION 213, LLC

( * ) Notice: Subject to any disclaimer, the term of this patent is extended or adjusted under 35 U.S.C. 154(b) by 1210 days.

(21) Appl. No.: 17/152,565

(22) Filed: Jan. 19, 2021

(65) Prior Publication Data
US 2021/0137887 A1 May 13, 2021

Related U.S. Application Data

(63) Continuation-in-part of application No. PCT/US2019/043288, filed on Jul. 24, 2019.

(60) Provisional application No. 62/702,863, filed on Jul. 24, 2018, provisional application No. 62/968,100, filed on Jan. 30, 2020, provisional application No. 62/703,830, filed on Jul. 26, 2018.

(51) Int. Cl.
| | |
|---|---|
| *A01N 25/02* | (2006.01) |
| *A61K 31/4025* | (2006.01) |
| *A61K 47/02* | (2006.01) |
| *A61K 47/22* | (2006.01) |
| *A61L 2/00* | (2006.01) |
| *A61M 35/00* | (2006.01) |

(52) U.S. Cl.
CPC .......... *A61K 31/4025* (2013.01); *A61K 47/02* (2013.01); *A61K 47/22* (2013.01); *A61L 2/0035* (2013.01); *A61M 35/003* (2013.01); *A61L 2202/182* (2013.01); *A61L 2202/21* (2013.01)

(58) Field of Classification Search
None
See application file for complete search history.

(56) References Cited

U.S. PATENT DOCUMENTS

| | | |
|---|---|---|
| 3,911,107 A | 10/1975 | Krezanoski |
| 4,427,631 A | 1/1984 | Bunting et al. |
| 9,566,421 B2 | 2/2017 | Casey et al. |
| 2012/0015419 A1 * | 1/2012 | Laugharn, Jr. ......... C12N 13/00 435/306.1 |

FOREIGN PATENT DOCUMENTS

| | | | | |
|---|---|---|---|---|
| AU | 2017247694 A1 * | 10/2018 | ............. | A61K 31/00 |
| CN | 106999588 A * | 8/2017 | ............. | A61P 37/02 |
| JP | S59025751 A | 2/1984 | | |
| JP | H02-134322 A | 5/1990 | | |
| JP | 3849736 B2 * | 11/2006 | | |
| JP | 2010100533 A | 5/2010 | | |
| JP | 2011026248 A | 2/2011 | | |
| JP | 2012513879 A | 6/2012 | | |
| WO | 9708238 A1 | 3/1997 | | |
| WO | 0064429 A1 | 11/2000 | | |
| WO | WO-2014152723 A1 * | 9/2014 | ............. | A61K 31/14 |
| WO | WO-2018115097 A1 * | 6/2018 | ................ | A61J 1/00 |

* cited by examiner

*Primary Examiner* — Susan T Tran

(74) *Attorney, Agent, or Firm* — Arent Fox LLP and Care Fusion

(57) ABSTRACT

A ready-to-use, gamma-ray sterilized, surgical antiseptic composition comprising an initial non-toxic concentration of povidone-iodine above a minimum effective concentration of available iodine, iodide in sufficient quantity to provide donor iodine upon gamma irradiation to stabilize said povidone-iodine and maintain said minimum effective concentration of available iodine, and a buffered saline solution.

19 Claims, 10 Drawing Sheets

READY-TO-USE, TERMINALLY STERILE PACKAGING FOR SURGICAL ANTISEPTIC AND METHOD OF USE

CROSS-REFERENCE TO RELATED APPLICATIONS

The present application is a continuation-in-part of International Application No. PCT/US2019/043288, filed Jul. 24, 2019, which claims priority to U.S. Provisional Application No. 62/702,863, filed Jul. 24, 2018, and U.S. Provisional Application No. 62/703,830, filed Jul. 26, 2018. The present application also claimed priory to U.S. Provisional Application No. 62/968,100, filed Jan. 30, 2020. The contents of these applications are expressly incorporated by reference in their entirety.

FIELD OF INVENTION

The present invention relates, generally, to a ready-to-use, sterilized surgical antiseptic and packaging therefor, and, more specifically, to a sterilized, povidone-iodine solution having a non-toxic concentration of iodine in a terminally sterile or sterilizable package to facilitate its use in surgical procedures without further dilution in the operating room, and within the sterile field without the need for initial preparations.

BACKGROUND

Povidone-iodine is a chemical complex of povidone, hydrogen iodide, and elemental iodine. It is antiseptic that works by releasing iodine which results in the death of a range of microorganisms. Povidone-iodine is available over-the-counter in concentrations from 9% to 12% available iodine.

Povidone-iodine has traditionally been used for skin disinfection before and after surgery. It may be used both to disinfect the skin of the patient and the hands of the healthcare providers. Although it may be used topically or on minor wounds "as is" over-the-counter, for larger wounds, surgical applications and application to mammalian tissue in general, the over-the-counter concentration is too high. Indeed, povidone-iodine can be toxic in concentrations greater than 3% if applied directly to the mammalian tissue. Accordingly, surgeons typically reduce the concentration of povidone-iodine to below 3% in the operating room. This dilution requires opening the povidone-iodine packaging in the operating room, and mixing it with a saline solution at the time of use. This is typically performed outside the sterile field, as conventional packaging is not terminally sterile or sterilizable while maintaining the integrity of the povidone-iodine solution. Accordingly, the povidone-iodine solution is typically prepared by opening non-sterile packaging immediately outside the sterile field, and then passing the sterile solution into the sterile field.

Although this technique is effective in disinfecting the incision and reducing the likelihood of infection, the task of having to mix the povidone-iodine in the operating room to reduce its concentration tends to be a distraction during the operation and a waste of valuable time. What is needed is a ready-to-use solution of povidone-iodine having a nontoxic concentration of povidone-iodine. Further, what is needed is a ready-to-use packaging that is terminally sterile (or sterilizable) while maintaining the integrity of the povidone iodine solution, such that the packaging may be opened and used within the sterile field, without the need to open the package and/or mix the solution outside the sterile field.

Providing a low-concentration povidone-iodine solution for surgical applications is complicated by the need to use only sterilized solutions. Sterile povidone-iodine is needed because the non-sterile form of povidone-iodine is susceptible to intrinsic contamination with *B. cepacia* and other opportunistic pathogens. However, sterilizing povidone iodine, particularly using gamma rays, tends to degrade the povidone iodine, generally causing a reduction in available iodine. Although this reduction in available iodine can be tolerated for relatively high concentrations of povidone-iodine found in over-the-counter products, if the concentration is reduced to less than 3% or even less than 1%, as is used in surgical applications, then the degradation of the povidone-iodine cannot be tolerated as it results in the available iodine dropping below a minimum effective concentration.

Therefore, what is needed is a ready-to-use, gamma-ray sterilized, package containing a gamma-ray sterilized povidone-iodine solution with a concentration of available iodine above the minimum effective concentration. The present invention fills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

It has been discovered unexpectedly that a dilute, non-toxic concentration of povidone-iodine in a buffered saline solution can be rendered pharmaceutically stable by the inclusion of certain excipients to maintain its efficacy as an antibacterial irrigation solution even after being sterilized by gamma radiation. Without being bound to any particular theory, or in any way limiting the scope of the claims, Applicant surmises that this unexpected result may be the result of iodide providing donor iodine during gamma radiation to stabilize the povidone-iodine. More specifically, the povidone-iodine complex is initially formed by the reaction of elemental iodine (12) with polyvinyl pyrrolidone (also known as povidone, or simply PVP):

$$\text{povidone} + \text{iodine} \rightarrow \text{povidone/iodine} \tag{1}$$

When in the solid state, the povidone-iodine complex is very stable. However, when the povidone-iodine complex is dissolved in water, an equilibrium reaction ensues where some dissociation of the complex takes place, producing iodide ion ($I^-$) as an effective degradation product. In simplified terms, one can describe the equilibrium between the povidone-iodine complex and iodide ion as follows:

$$\text{povidone-iodine} \leftrightarrows \text{povidone} + \text{iodide} \tag{2}$$

This reaction is governed by the equilibrium constant expression:

$$K_{eq} = [\text{povidone}][\text{iodide}]/[\text{povidone/iodine}] \tag{3}$$

where the quantities in brackets reflect the concentrations of the species under the equilibrium conditions. It is known in the literature that the value for Keq is not large, and that aqueous solutions of povidone-iodine will undergo progressively more dissociation (i.e., transformation of povidone-iodine into free povidone and free iodide) as the concentration of povidone-iodine in the solution is decreased. For this reason, in the past, reasonably stable solutions of povidone-iodine have been achieved simply through the use of high concentrations of dissolved complex.

However, consideration of the chemical equilibrium of equation (2) reveals that the addition of extra iodide ion (in the form of, e.g., potassium, sodium, or ammonium iodide) to an aqueous solution containing the povidone-iodine complex would suppress the dissociation reaction and provide stability to the solution by better maintaining the concentration of the povidone-iodine complex. In other words, the addition of additional product to the solution would favor the existence of the complex. This principle has been achieved in the present formulation, where it has been found that aqueous solutions of the povidone-iodine complex maintain acceptable stability even at concentrations that are one-tenth those existing in conventional formulations.

Furthermore, it has been shown that when the dilute formulations of the present invention are sterilized by gamma radiation, the position of the equilibrium of equation (2) is further shifted to favor additional levels of the povidone-iodine complex relative to the starting amounts. This observation can only be explained by an increase in the equilibrium constant value (Keq) for reaction (2) during the irradiation process. It has been found that by using the correct ratio of povidone-iodine to iodide ion in initially prepared formulations, and subsequently sterilizing these solutions by means of gamma radiation, povidone-iodine solutions that are both stable and efficacious even at complex concentration values that are approximately one-tenth in magnitude relative to conventional formulations have been obtained.

Accordingly, in one embodiment, the invention relates to a ready-to-use, gamma-ray sterilized, surgical antiseptic composition comprising: (a) an initial non-toxic concentration of povidone-iodine above a minimum effective concentration of available iodine; (b) iodide in sufficient quantity to provide donor iodine upon gamma irradiation to stabilize the povidone-iodine and maintain the minimum effective concentration of available iodine; and (c) a buffered saline solution.

As used herein, a "buffered saline solution" refers to a solution of sodium chloride and a buffer in water. As used herein, the term "buffer" refers to a component present in a composition or solution which may provide a resistance to significant change in pH caused by a strong acid or base. A buffer may comprise a single agent or more than one agent, such as a weak acid and its conjugate base. A buffer may provide a resistance to a significant pH change by interacting with a strong acid or strong base in a composition or solution, thereby at least partially preventing the pH of the composition or solution from changing significantly. According to some aspects, the buffer may be sufficient to maintain the pH of an antiseptic composition as described herein between 5.1 and 5.7 prior to gamma radiation sterilization of the antiseptic composition, optionally between about 5.2 and 5.7, and optionally at about 5.5. One non-limiting example of a buffer according to the present disclosure includes sodium phosphate.

In another embodiment, the invention relates to a method of using the composition described above comprising: applying the composition non-topically to mammalian tissue without diluting the composition.

In still another embodiment, the invention relates to a method of preparing the composition, comprising: (a) disposing the composition in a package; (b) exposing the package containing the composition to gamma radiation to sterilize the package and the composition; and (c) wherein, while being irradiated, the iodide donates iodine to stabilize the povidone-iodine to maintain the minimum concentration of available iodine.

In yet another embodiment, the invention relates to a package containing the composition described above. In a particular embodiment, the package is a polypropylene squirt bottle.

In yet another embodiment, the invention relates to a package containing a surgical antiseptic composition. In a particular embodiment, the package comprises: (a) an initial non-toxic concentration of povidone iodine above a minimum effective concentration of available iodine; (b) iodide in sufficient quantity to provide donor iodine upon gamma irradiation to stabilize the povidone iodine and maintain the minimum effective concentration of available iodine; and (c) a buffered saline solution.

In still another embodiment, the invention relates to a ready-to-use terminally sterile antiseptic delivery system comprising: (a) a sterile package constructed of a radiation safe material; (b) a sterile surgical antiseptic composition contained with the package, the surgical antiseptic composition comprising: (i) an initial non-toxic concentration of povidone iodine above a minimum effective concentration of available iodine; (ii) iodide in sufficient quantity to provide donor iodine upon gamma irradiation to stabilize the povidone iodine and maintain the minimum effective concentration of available iodine; and (iii) a buffered saline solution.

In still another embodiment, the invention relates to a package configured for compact storage, the package comprising: (a) a bottle comprising a closed body defining an internal cavity for receiving contents therein, the bottle extending along a longitudinal axis and, the bottle having a maximum width as measured transversely to the longitudinal axis, the bottle being asymmetrical about its longitudinal axis to form a longitudinally-extending depression in an outer surface of the first bottle adjacent a complementary longitudinally-extending protuberance in the outer surface of the bottle; (b) whereby a pair of the bottles has a combined width less than twice the maximum width of one bottle when the pair of bottles are positioned in a nested juxtaposed relationship in which the respective protuberance of each bottle is positioned within the respective depression of the other bottle.

DESCRIPTION

Figure 1:
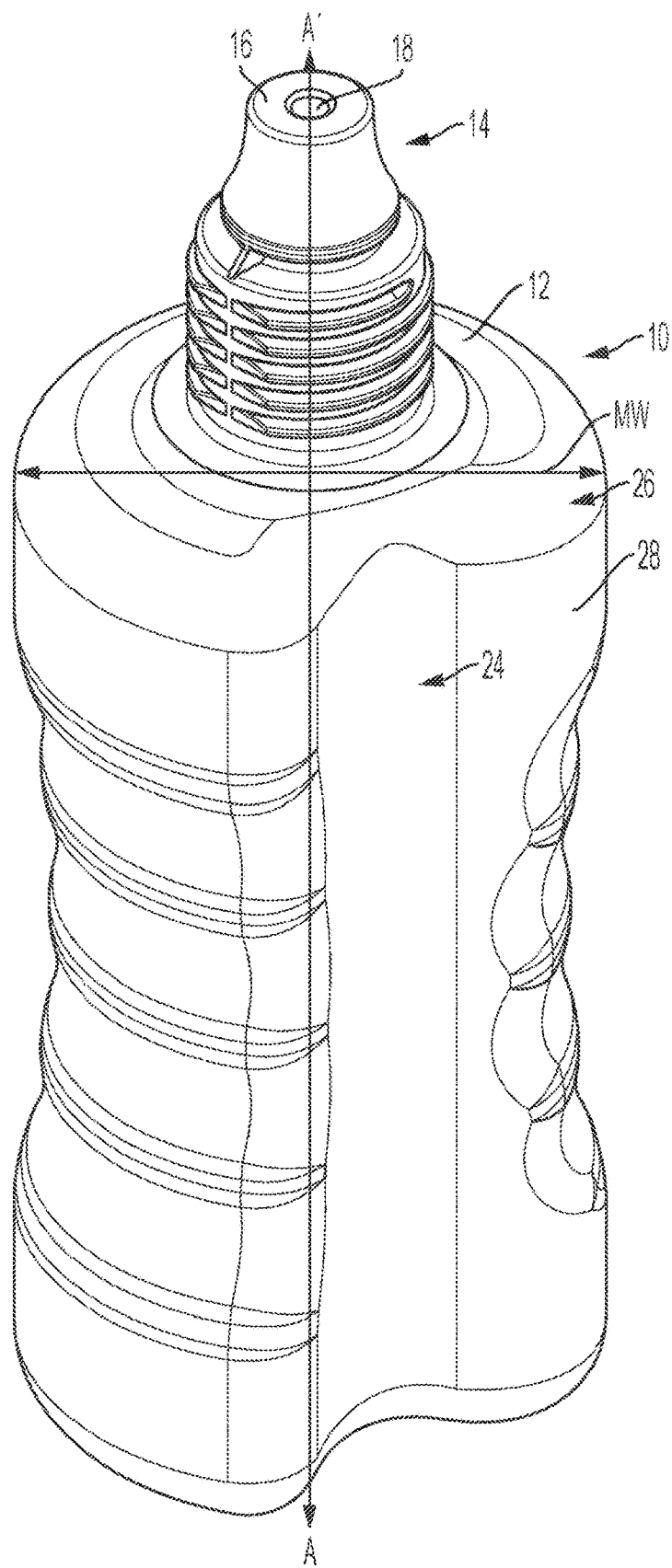
FIG. 1 is a rear perspective view of an exemplary package in the nature of a bottle in accordance with an exemplary embodiment of the present invention.

In the following paragraphs, the present invention will be described in detail by way of example. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

It has been found surprisingly that dilute, non-toxic concentration of povidone-iodine dissolved in phosphate-buffered saline solution comprising certain excipients is pharmaceutically stable even after being sterilized by gamma radiation. These solutions still maintain their efficacy as an antibacterial irrigation solution for an extended period of time.

As used herein, non-toxic concentration of povidone-iodine pertains to surgical applications in which the antiseptic solution is applied to human and other mammalian tissue, and does not pertain to safe levels of povidone-iodine for topical application on the skin, which is much higher. Therefore, the non-toxic concentration of povidone-iodine referred to herein will be lower than topical applications. In light of this disclosure, one of skill in the art can determine non-toxic concentrations of povidone-iodine based on, for example, the tissue to be disinfected, the volume of disinfectant to be used, pre-existing conditions of the patient, the ability to remove excess disinfectant, temperature, pH of the solution, as well as other considerations. For example, in one embodiment, the non-toxic concentration of povidone-iodine is no greater than about 3% w/v, in another embodiment, the non-toxic concentration of povidone-iodine is no greater than about 2% w/v, in another embodiment, the non-toxic concentration of povidone-iodine is no greater than about 1% w/v, and in yet another embodiment, the non-toxic concentration of povidone-iodine is no greater than about 0.5% w/v.

As used herein, the minimum effective concentration of iodine means the concentration of iodine below which its efficacy is impaired. Again, in light of this disclosure, one of skill in the art can determine the minimum effective concentration of iodine based on, for example, the tissue to be disinfected, the volume of disinfectant to be used, pre-existing conditions of the patient, the ability to remove excess disinfectant, temperature, pH of the solution, as well as other considerations. For example, in one embodiment, the minimum effective concentration of iodine is no less than about 0.2% w/v, in one embodiment, the minimum effective concentration of iodine is no less than about 0.3% w/v, and, in a more particular embodiment, is no less than about 0.4% w/v.

One of skill in the art, in light of this disclosure, will be able to determine, without undue experimentation, a sufficient quantity of iodide to provide enough donor iodine to stabilize the povidone-iodine to maintain the minimum effective concentration of available iodine. Generally, the concentration of povidone-iodine and iodide in the solution will be similar, although the concentration of povidone-iodine will be greater. Generally, as the concentration of povidone-iodine decreases, and/or the intensity of the gamma radiation increases, the relative concentration of iodide increases. Likewise, with higher initial concentrations of povidone iodine, and/or lower doses of gamma radiation, the relative concentration of iodide decreases. Again, one of skill in the art can readily determine the appropriate concentrations of povidone-iodine and iodide in light of this disclosure to provide sufficient donor iodine to maintain the minimum effective concentration of available iodine. In one embodiment, wherein x is the concentration of povidone-iodine and y is the concentration of iodide, the relative concentrations are as follows $0.1x \leq y \leq 2x$, in a more particular embodiment, $0.2x \leq y \leq 1x$, and, in a more particular embodiment, $0.3x \leq y \leq 0.6x$.

Measurement of the amount of iodine in the composition is especially important for evaluation of the stability of the formulation, and a spectrophotometric method of analysis has been developed for this purpose. The method is based on the observation that when dissolved in methanol, the povidone-iodine complex exhibits a peak maximum in its absorption spectrum at 360 nm. To run the assay, three milliliters ($V_{initial}$) of methanol are first pipetted into a spectrophotometer cuvette, whereupon known microliter ($V_{added}$) amounts of the povidone-iodine composition are pipetted into the cuvette. After mixing, the absorbance of the resulting solution at 360 nm is determined. The relationship between absorbance at 360 nm (ABS) and the concentration of povidone-iodine in the analyzed solution has been determined, and over a measured absorbance range of 0.05 ABS units to 0.75 ABS units the following relationship exists:

$$[\text{conc w/v}] = 0.001713 + 0.02056*(\text{ABS}) - 0.007594*(\text{ABS})^2$$

After all volumes have been converted into units of milliliters, the percentage (in w/v units) of povidone-iodine originally present in the analyzed composition solution is determined using the following relationship:

$$[\text{initial conc } w/v] = \frac{[\text{conc } w/v]*(V_{initial}) + V_{added})}{V_{added}}.$$

Beyond the povidone-iodine and iodide ion, in some embodiments, the composition may also comprise surfactants, salts, and other additives to adjust the fluid's surface tension, buffering/pH, viscosity, or other property. Those of skill in the art will be able to identify and optimize the concentration of these additives without undue experimentation in light of this disclosure. For example, it is generally preferred for the solution to be slightly acidic. As used herein, "slightly acidic" refers to a pH of no more than about 7, and optionally between about 5.1 and 5.7, optionally between about 5.2 and 5.7, and optionally about 5.5. Accordingly, it should be understood that the selection/concentration of these additives in the preferred embodiments described below are not limiting, and those of skill in the art will appreciate that the additives and their concentrations can vary considerably within the scope of the invention.

One advantage of the antiseptic composition as described herein is that the components are relatively inexpensive and commercially available. Those of skill in the art will be able to identify various commercial sources of the components of the claim composition in light of this disclosure. For example, in one embodiment, the povidone-iodine component of the composition is sourced as a powdered product that consists of a complex of polyvinyl pyrrolidone (povidone, or PVP) and iodine. For example, one may use the povidone-iodine product identified by BASF Corporation as containing povidone K 30/06 in the composition. The source of water-soluble iodide ion may also be commercially available. For example, the iodide ion may be provided by any acceptable source of water-soluble iodide ions, including but not limited to sodium iodide, potassium iodide, ammonium iodide, and combinations thereof.

In one embodiment, the pharmaceutically stable composition of povidone-iodine comprises about 0.3% to 1.0% w/v of povidone/iodine, about 0.05% to 0.5% w/v of a source of water-soluble iodide ion, a surfactant, preferably in an amount of about 0.01% to 0.02% w/v, and a buffered saline solution, preferably comprising about 0.9% w/v sodium chloride and about 0.1 M sodium phosphate. The pH of the composition preferably is initially adjusted between pH 5.1 and 5.7 prior to gamma radiation sterilization.

In a more particular embodiment, the pharmaceutically stable composition of povidone-iodine comprises about 0.3% to 1.0% w/v of povidone/iodine, about 0.05% to 0.5% w/v of potassium iodide, about 0.01% to 0.02% w/v of vitamin E TPGS, about 0.9% w/v sodium chloride, and about 0.1 M sodium phosphate. The pH of the composition preferably is initially adjusted between pH 5.1 and 5.7 prior to sterilization by means of gamma radiation.

According to some aspects, the surfactant comprised by the pharmaceutically stable composition may comprise a nonionic surfactant. One non-limiting example of a nonionic surfactant includes vitamin E, such as tocophersolan (also referred to herein as Vitamin E TPGS). According to some aspects, the pharmaceutically stable composition may comprise a nonionic surfactant sufficient to provide an acceptable headspace in a filled container.

As used herein, the term "headspace" refers to the volume of a container unoccupied by a product (such as an antiseptic composition) contained in the container, and may alternatively be referred to herein as "excess fill volume." It should be understood that in the case of a container containing a liquid product, the headspace may correspond to the volume of gas contained in the container.

According to some aspects, an acceptable headspace may correspond with a headspace that provides an acceptable degradation of a container upon gamma radiation of the container and a composition contained therein, for example, according to a method as described herein.

According to some aspects, the nonionic surfactant according to the present disclosure may provide a reduced headspace when compared with a similar composition without a nonionic surfactant as disclosed herein.

For example, it is expected in the art that a surfactant comprised by a pharmaceutical composition will foam during filling of a container with the same. As such, conventional methods for filling containers with pharmaceutical compositions comprising a surfactant require a certain headspace to account for such foaming. However, Applicant observed unexpectedly that the pharmaceutically stable composition having a nonionic surfactant as described herein foams very little, if at all. Indeed, the reduced foaming of a vitamin E surfactant facilitates filling the container well above normal limits, and well beyond conventional headspace.

By way of background, ordinarily, a certain amount of headspace is required to accommodate foaming, volumetric expansion/contraction, tolerances, and/or other issues. This headspace generally ranges from 30 to 40% of the volume of the container. In that regard, Applicant discovered that such headspace often facilitates the degradation of the container following sterilization. More specifically, Applicant discovered that gamma radiation of the vapor within the headspace causes the vapors therein to degrade containers, particularly polymer containers including but not limited to those comprising polypropylene. Conversely, Applicant has found that if the headspace is kept to a minimum, degradation of the container is also kept to a minimum.

Accordingly, another aspect of the present invention is Applicant's discovery that (1) a vitamin E surfactant does not contribute significantly to foaming—and therefore, reduces the need for headspace to accommodate foaming; and (2) gamma-radiated vapors in the headspace contribute to the degradation of polymer containers, and thereby, by reducing the headspace, the degradation of the polymer containers is reduced in kind.

According to some aspects, the present disclosure is directed to a pharmaceutically stable composition as described herein, wherein the pharmaceutically stable composition comprises a nonionic surfactant and is contained in a container having an acceptable headspace. According to some aspects, the acceptable headspace is less than about 33% of the volume of the container, optionally less than about 25% of the volume of the container, optionally less than about 20% of the volume of the container, optionally less than about 15% of the volume of the container, and optionally less than about 10% of the volume of the container.

According to some aspects, the headspace of the container may correspond with the volume of pharmaceutically stable composition contained in the container. For example, according to some aspects, the container may contain at least about 67% by volume of the pharmaceutically stable composition, optionally at least about 75% by volume, optionally at least about 80% by volume, optionally at least about 85% by volume, optionally at least about 90% by volume.

According to some aspects, the pharmaceutically stable composition may comprise between about 0.001 and 0.03% w/v nonionic surfactant, optionally between about 0.001 and 0.04% w/v, optionally about 0.02% w/v, and optionally about 0.015% w/v.

According to some aspects, the pharmaceutically stable composition of povidone-iodine may comprise about 0.3% to 0.5% w/v of povidone/iodine, about 0.1% to 0.3% w/v of potassium iodide, about 0.01% to 0.015% w/v of vitamin E TPGS, and about 0.9% w/v sodium chloride and about 0.1 M sodium phosphate as a buffered saline solution. The pH of the composition is initially adjusted between pH 5.2 and 5.7 prior to sterilization by means of gamma radiation.

According to some aspects, the composition may comprise or consist of an aqueous solution containing about 0.4% w/v of povidone/iodine, about 0.3% w/v potassium iodide, about 0.015% w/v vitamin E TPGS, about 0.9% w/v sodium chloride, and about 0.1 M sodium phosphate. The pH of the composition is initially adjusted to 5.5 prior to gamma radiation sterilization.

FIGS. 1-10 are views of an exemplary package 10 in accordance with the present invention. In accordance with the present invention, the exemplary package 10 is formed of a radiation-safe material, and in particular a gamma radiation safe material. In this context, a radiation-safe material is a material that can be irradiated for sterilization purposes without structural damage to the package such that the package may continue to contain its contents, and while permitting the contents of the package to be sterilized by the radiation without resulting in an unacceptable loss of integrity of the antiseptic solution contained therein. An unacceptable loss of integrity of the antiseptic solution is a change in characteristics of the antiseptic solution that would render it unsafe or unsuitable for use for its intended purpose as an antiseptic solution.

In accordance with the present invention, the package 10 is terminally sterilizable in that the package can be gamma-ray sterilized, while containing a povidone iodine solution with a concentration of available iodine above the minimum effective concentration, to provide a ready-to-use terminally sterilized package containing a gamma ray sterilized povidone iodine solution with a concentration of available iodine above the minimum effective concentration. Accordingly, the terminally sterilized package can be introduced into the sterile field, be handled and opened within the sterile field, and can be used to dispense its sterile contents, without compromising the integrity of the sterile field.

In this exemplary embodiment, the radiation-safe material is a polypropylene material, and particularly, a gamma radiation safe polypropylene material.

Although the package 10 may have any suitable form, in this exemplary embodiment, the package has the form of a bottle. Referring now to FIG. 1, the package/bottle 10 has a closed body 12 defining an internal cavity 14 for receiving contents herein. In the embodiment shown, the closed body is continuous to fully enclose the internal cavity. In this embodiment, the closed body may be punctured to provide an opening for dispensing the contents of the bottle. Further, the exemplary bottle 10 shown is configured as a squirt bottle in that it is tapered to include a nozzle 14 and is constructed of pliable material that can be readily squeezed by hand, such that the contents of the bottle can be dispensed via an opening by manual squeezing of the body 12.

Figure 2:
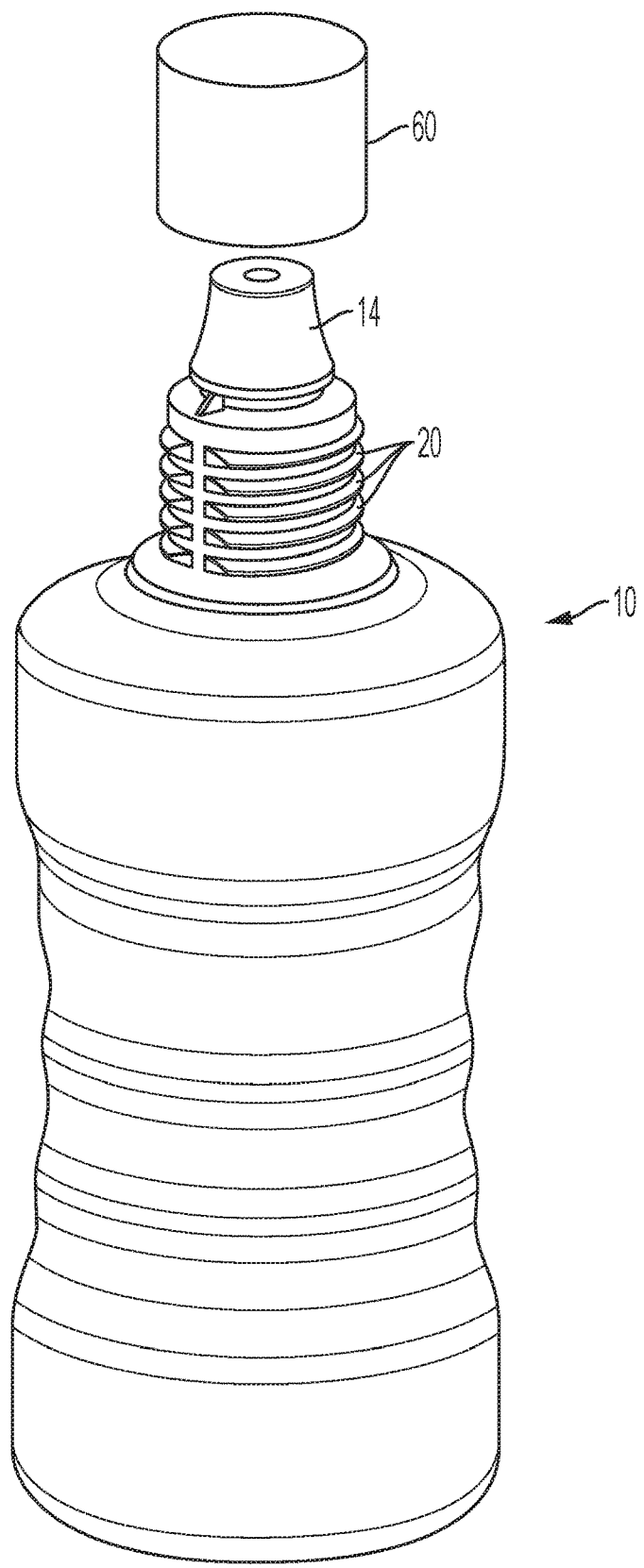
FIG. 2 is a front perspective view of the bottle of FIG. 1.
Figure 3:
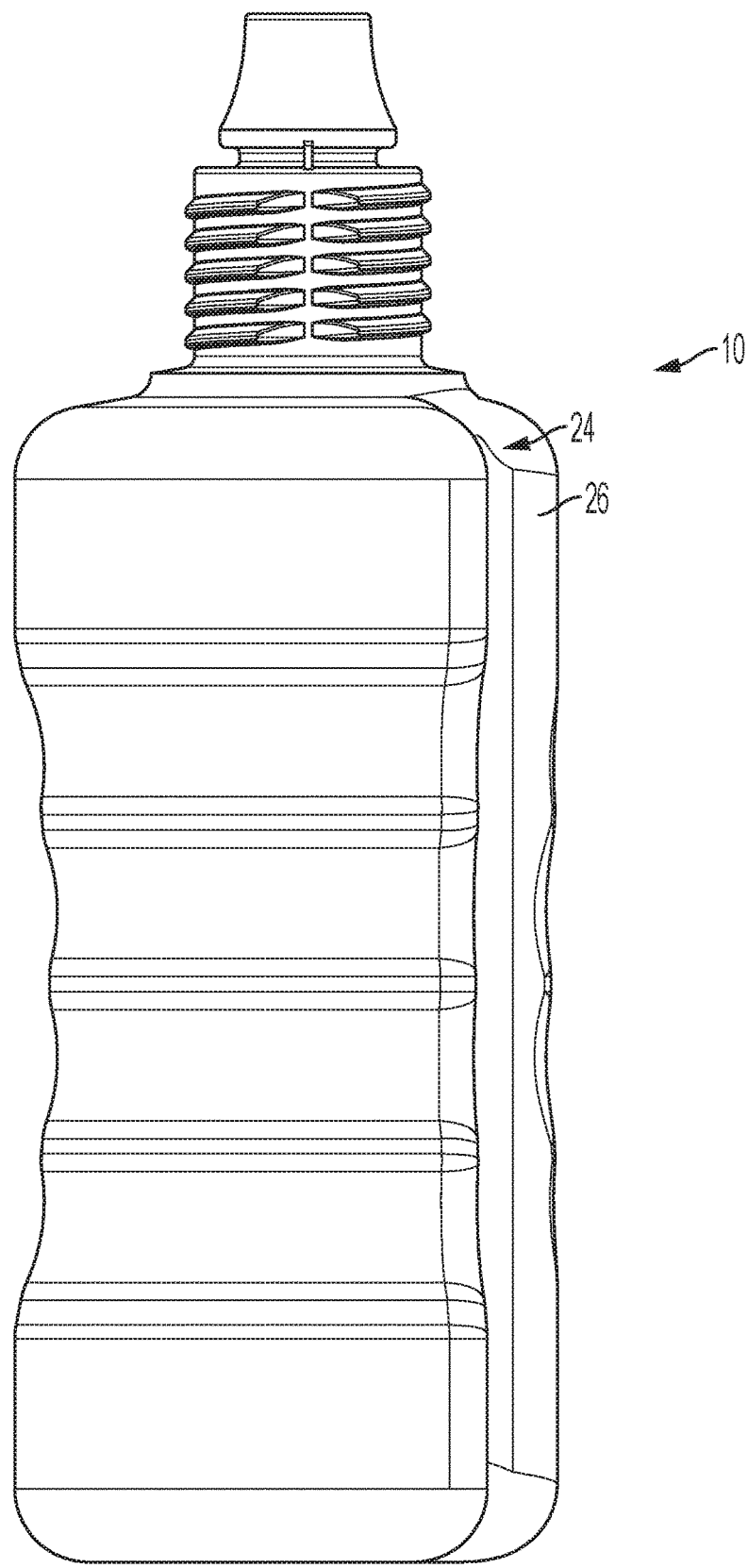
FIG. 3 is a right side view of the bottle of FIG. 1.
Figure 4:
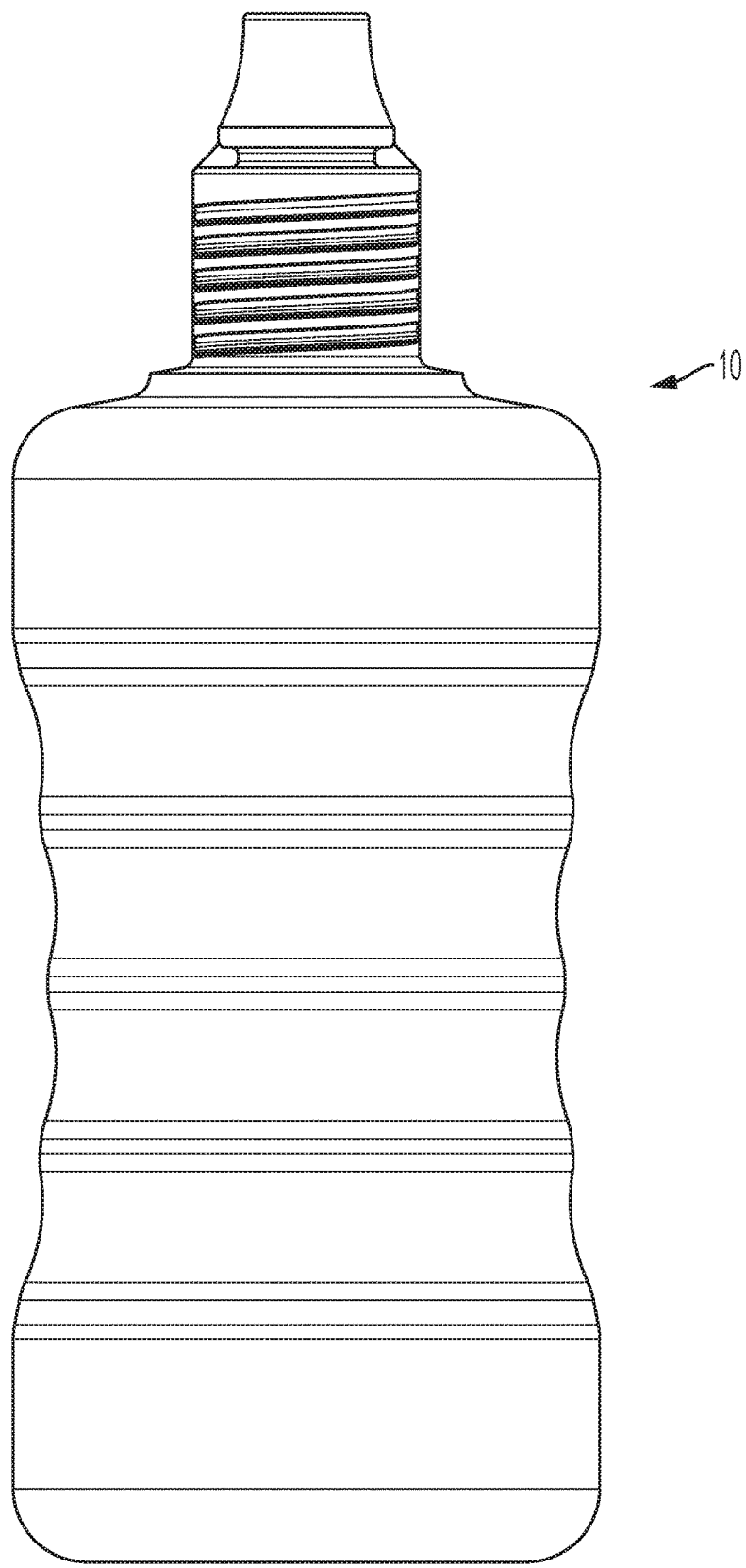
FIG. 4 is a front side view of the bottle of FIG. 1.
Figure 5:
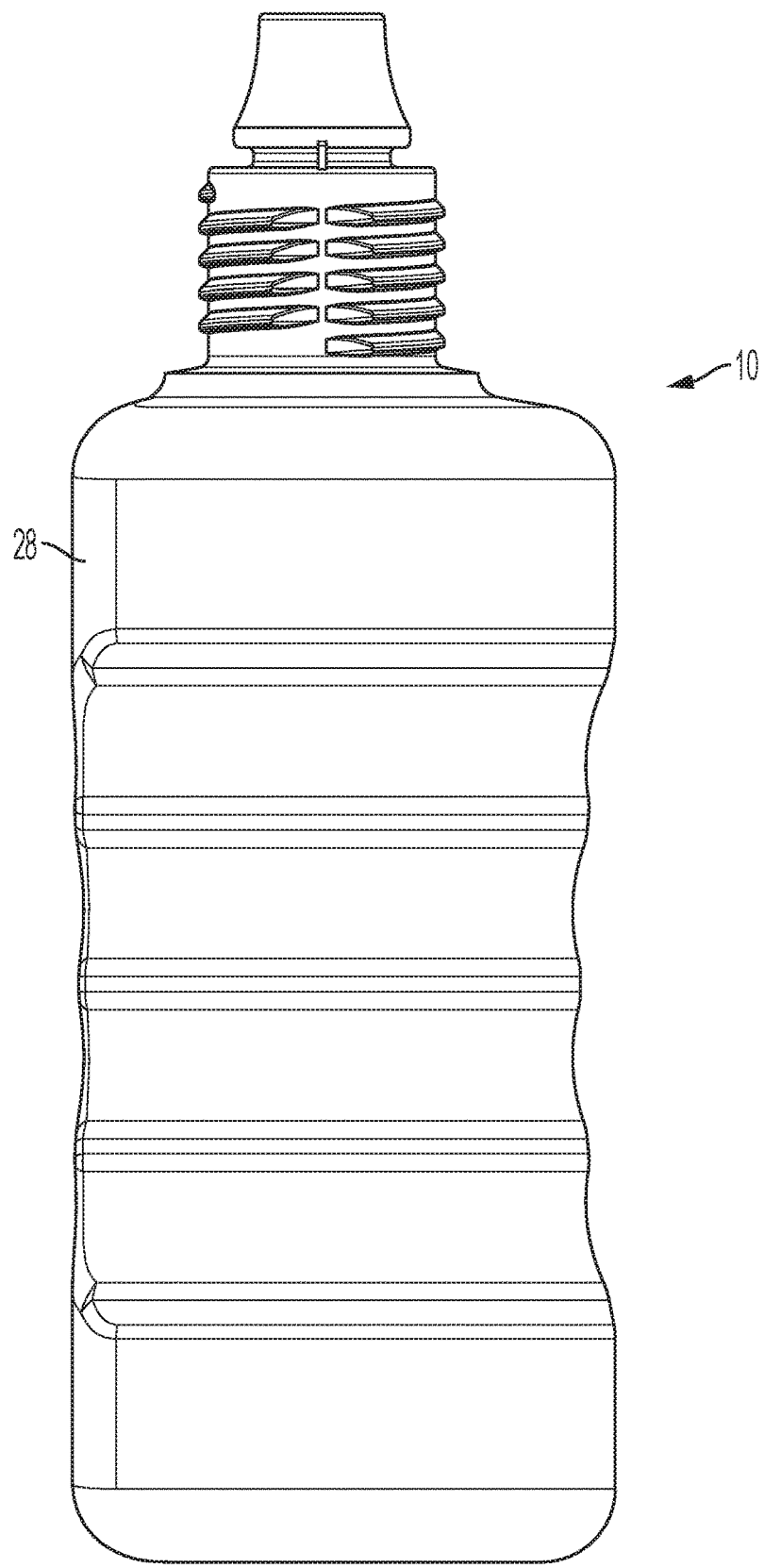
FIG. 5 is a left side view of the bottle of FIG. 1.
Figure 6:
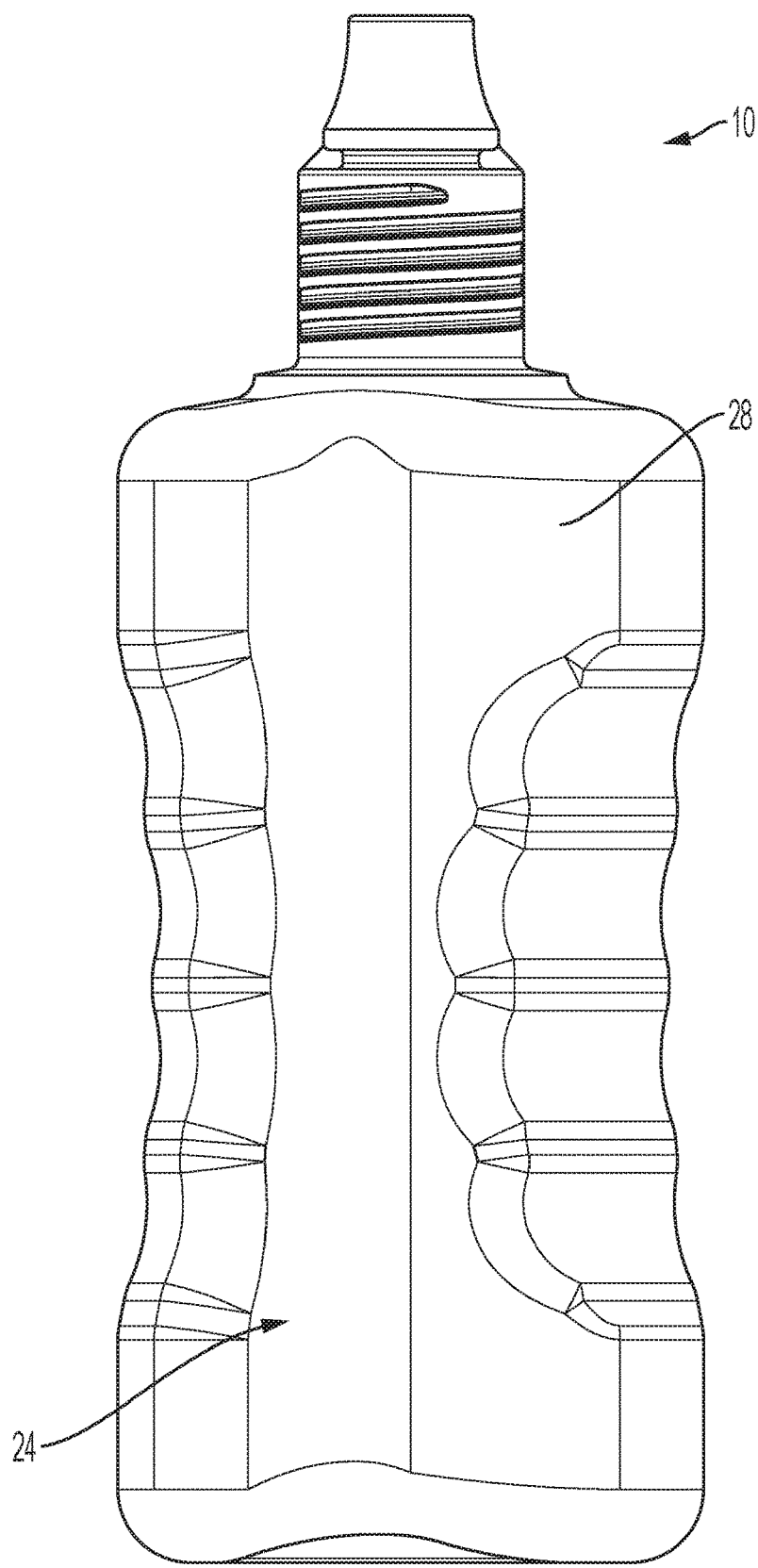
FIG. 6 is a rear side view of the bottle of FIG. 1.

The opening may be provided by puncturing the nozzle at its tip 16, and the tip 16 may be provided with a depression 18 or other surface feature to guide or facilitate puncturing of the bottle in a preferred location, as shown in FIG. 1. In other embodiments, the closed body is manufactured to be substantially closed except for an opening forming a mouth of the bottle, and the package 10 includes a cap 60 matable with the closed body to fully enclose the internal cavity, as best shown in FIG. 2. A mounting structure may be provided adjacent the tip 16 to facilitate mounting of the cap 20 to the bottle, e.g., after the tip has been punctured. In the embodiment shown, the mounting structure includes external screw threads 20, and the cap 60 includes complementary internal threads (not shown).

The package may contain a sterile surgical antiseptic composition within its cavity. The surgical antiseptic composition may comprise: an initial non-toxic concentration of povidone iodine above a minimum effective concentration of available iodine; iodide in sufficient quantity to provide donor iodine upon gamma irradiation to stabilize the povidone iodine and maintain the minimum effective concentration of available iodine; and a buffered saline solution. The pliable material may be a radiation safe polypropylene material for the reasons discussed herein. Accordingly, the bottle may include a substantially closed body terminating in a nozzle defining an opening, such that manually squeezing the relatively soft material of the bottle's body results in ejection of solution from within the bottle. Accordingly, the squirt bottle may be used as an applicator apparatus for delivery of the surgical antiseptic solution. A ready-to-use terminally sterile antiseptic delivery system includes a sterile package constructed of a radiation safe material, and a sterile surgical antiseptic composition contained with the package. Accordingly, the antiseptic delivery system may be sterilized, e.g., by exposure to gamma rays or other radiation, to sterilize both the package and the antiseptic solution, in particularly, in a single irradiation process while the antiseptic solution is contained within the package.

Figure 7:
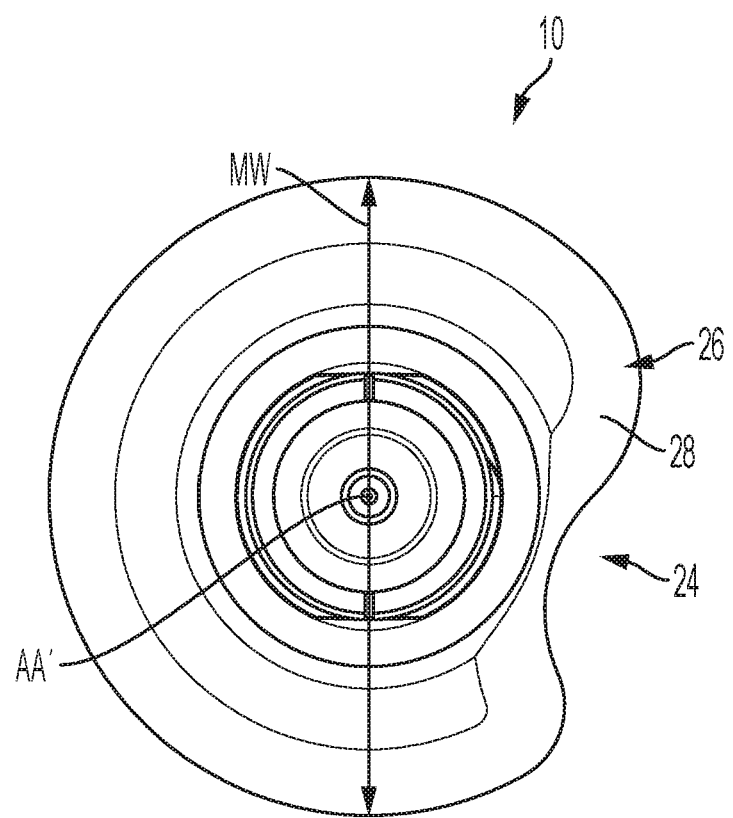
FIG. 7 is a top end view of the bottle of FIG. 1.
Figure 8:
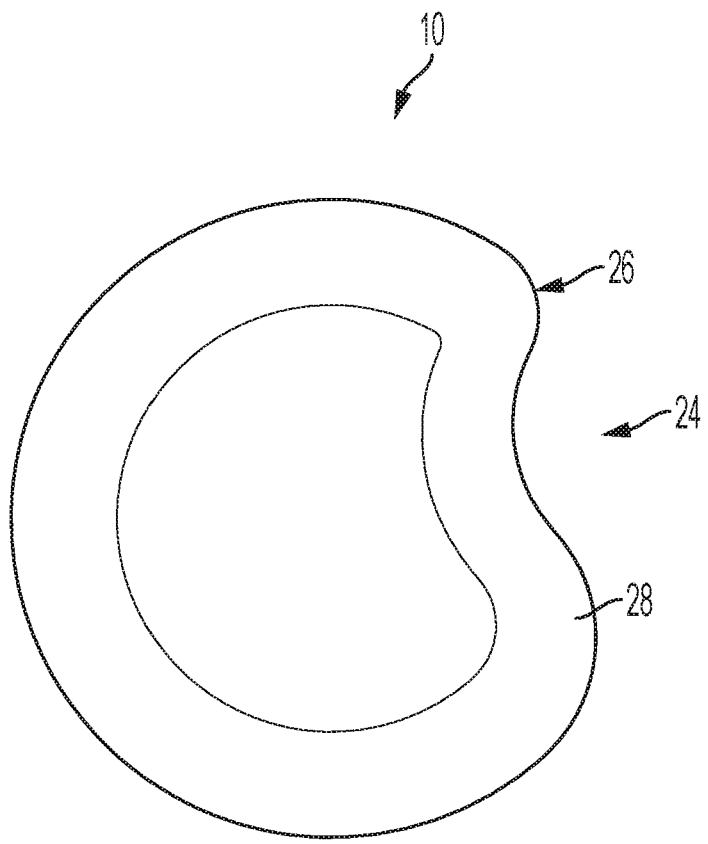
FIG. 8 is a bottom end view of the bottle of FIG. 1.

As will be appreciated from FIG. 1, the closed body 12 is elongated to extend along a longitudinal axis, shown as AA'. Consistent with an aspect of the present invention, the package is specially-configured for compact storage, e.g., when two packages are co-packaged in a box for shipping or storage purposes. The exemplary package 10 is so configured, as shown in FIGS. 1-10. More particularly, the exemplary closed body/bottle 12 is asymmetrical about its longitudinal axis AA (e.g., in cross-section transverse to AA') as will be appreciated from FIGS. 1, 7, 8 and 9. The bottle is asymmetrical to form a longitudinally-extending depression 24 in an outer surface 26 of the bottle 10 adjacent a complementary longitudinally-extending protuberance 28 in the outer surface 26 of the bottle, as best shown in FIGS. 1, 7 and 8. The depression and the bottle are hermaphroditic, in that a single bottle forms complementary male and female portions arranged such that the bottle is matable/nestable with itself.

Figure 9:
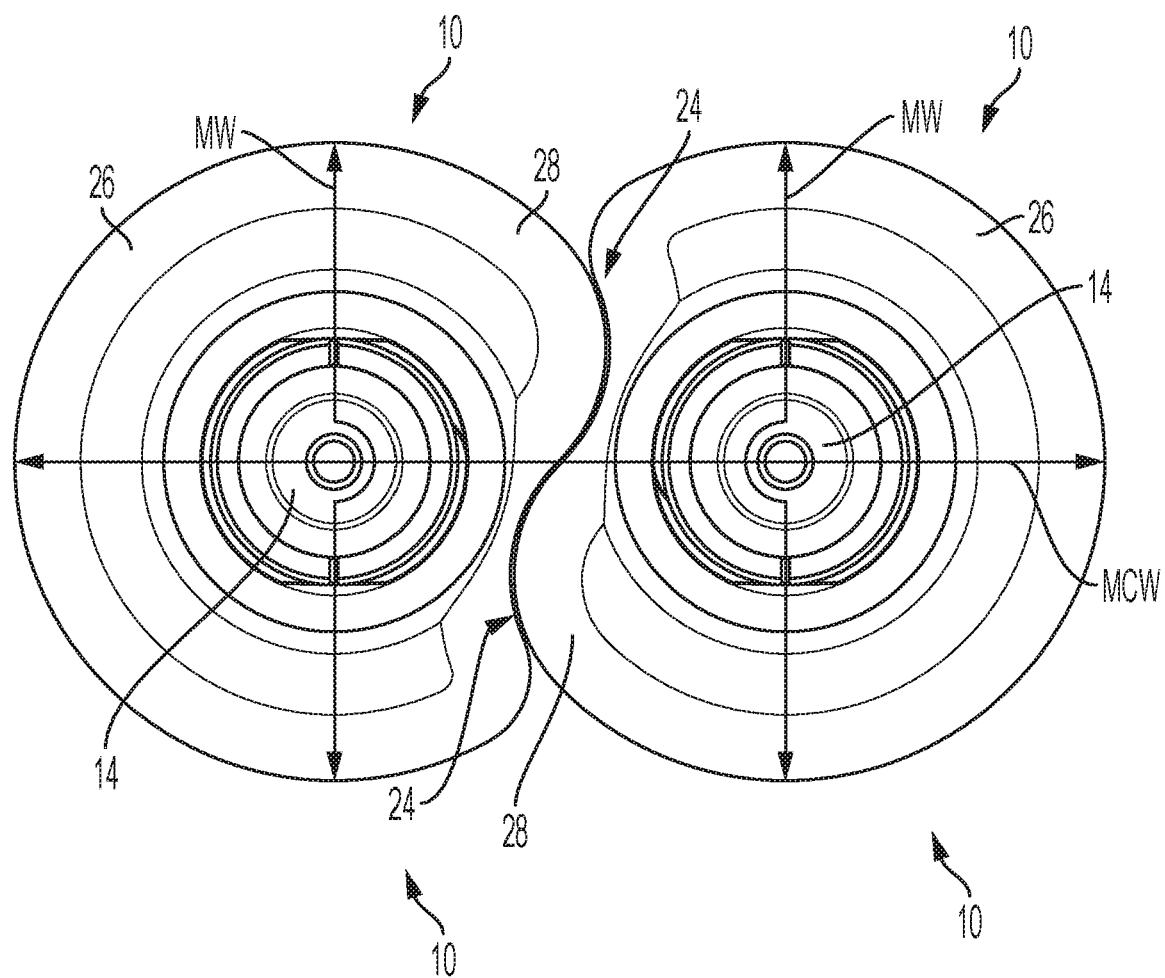
FIG. 9 is a top view of a pair of bottles of FIG. 1, shown in a nested juxtaposed relationship.
Figure 10:
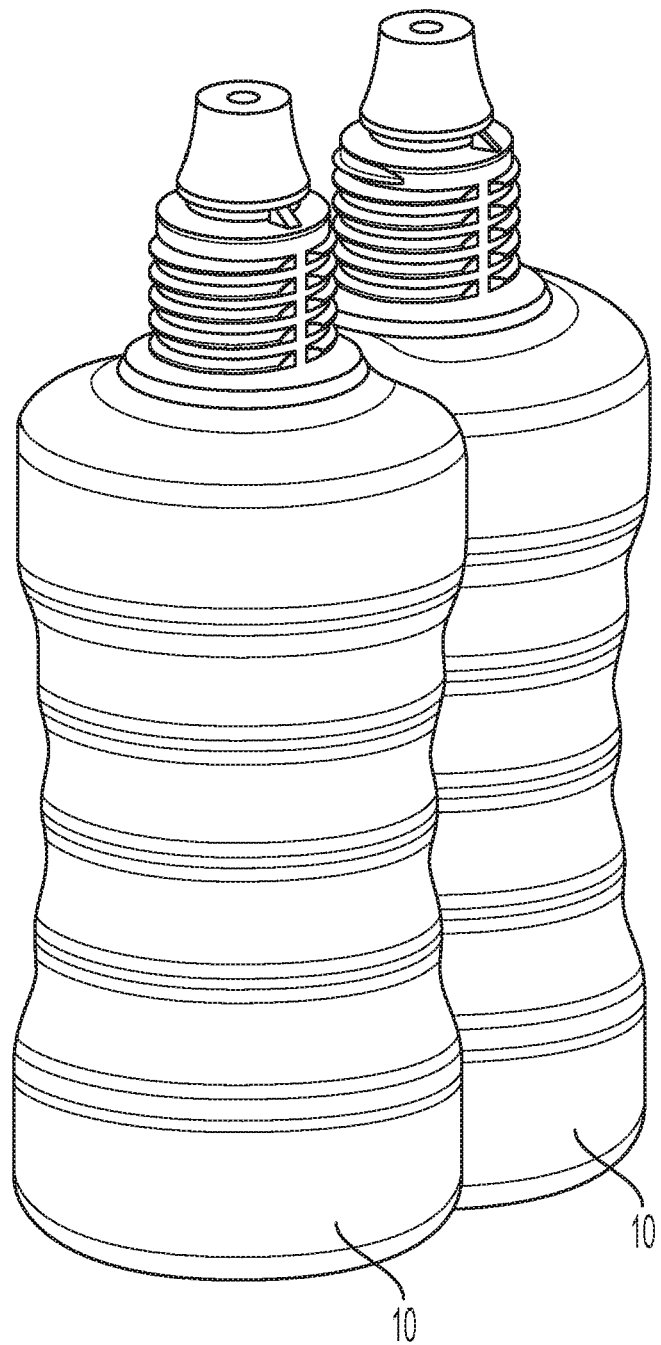
FIG. 10 is a perspective view of the pair of nested juxtaposed bottles of FIG. 9.

FIGS. 9 and 10 are top and perspective views of a pair of bottles of FIG. 1. As will be appreciated from FIGS. 9 and 10, each bottle is asymmetrical about its longitudinal axis to form a longitudinally-extending depression. The depression causes the bottle to have a cross-sectional area than is smaller than a corresponding cross-sectional area if the cross-section were to be symmetrical, without the depression. Further, the depression is hermaphroditic in shape, such that two bottles having identical (or nearly identical, but complementary structure, at least with respect to the depression) may be placed in a nested juxtaposed relationship, such that distance between their respective longitudinal axes is less than a corresponding distance would be if the bottles were symmetrical about their axes (with a corresponding diameter or other dimension), as will be appreciated from FIG. 9.

By way of further illustration, bottle/body 12 has a maximum width MW measured transversely to the longitudinal axis, as best shown in FIGS. 1, 7 and 9. A pair of bottles would thus have a combined maximum width (MCW) equal to 2MW. However, the bottles herein described have a minimum combined width less than twice the maximum width of one bottle when the pair of bottles are positioned in a nested juxtaposed relationship in which the respective protuberance 28 of each bottle is positioned within the respective depression 24 of the other bottle, as will be appreciated from FIG. 9. Resultingly, two of the bottles 10 can be arranged (e.g., co-packaged) in a nested relationship, in a relatively more compact arrangement that if the bottles lacked such depressions.

In some embodiments, a ready-to-use terminally sterile antiseptic delivery system may include two sterile packages constructed of a radiation safe material. In certain embodiments, the first sterile package may contain a sterile surgical antiseptic composition, and second sterile package may contain a sterile irrigation solution, such as sterile saline. The two sterile packages may be co-packed while they are in nested juxtaposed relationship, to provide for a compact packaged arrangement of the sterile packages.

Another aspect of the invention relates to a method of using the composition described above. In one embodiment, the method comprises opening a package containing the composition, and, without diluting the composition, applying the composition non-topically to mammalian tissue. In one embodiment, the package is opened within the sterile field of an operating room.

In yet another embodiment, the invention relates to a package containing the composition described above. In a particular embodiment, the package is a polypropylene squirt bottle.

In yet another embodiment, the invention relates to a method of preparing the a ready-to-use terminally sterilized package of antiseptic solution comprises: (a) disposing the composition described above in a package constructed of a radiation safe, e.g., polypropylene, material; (b) exposing the package containing the position to gamma radiation to sterilize the package and the composition contained therein, such that, while being irradiated, iodide of the composition donates iodine to stabilize the povidone iodine to maintain a minimum concentration of available iodine.

The word "about" is used herein to mean within ±5% of the stated value, optionally within ±4%, optionally within ±3%, optionally within ±2%, optionally within ±1%, optionally within ±0.5%, optionally within ±0.1%, and optionally within ±0.01%.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A container containing an antiseptic composition, the antiseptic composition comprising:
   povidone iodine provided at a concentration above a minimum effective concentration of available iodine;
   iodide provided at a concentration sufficient to maintain the concentration of povidone iodine above the minimum effective concentration of available iodine upon gamma irradiation of the antiseptic composition;
   a nonionic surfactant; and
   a buffered saline solution;
   wherein the container comprises a headspace of less than about 25% of the volume of the container, and
   wherein the container is a squirt bottle.

2. The container of claim 1, wherein the container comprises a headspace of less than about 20% of the volume of the container.

3. The container of claim 1, wherein the container comprises a headspace of less than about 15% of the volume of the container.

4. The container of claim 1, wherein the container comprises a headspace of less than about 10% of the volume of the container.

5. The container of claim 1, wherein the container comprises polypropylene.

6. The container of claim 1, wherein the nonionic surfactant comprises vitamin E.

7. The container of claim 6, wherein the vitamin E comprises vitamin E TPGS.

8. The container of claim 7, wherein the antiseptic composition comprises between about 0.001 and 0.04% w/v of the vitamin E TPGS.

9. The container of claim 1, wherein the minimum effective concentration of available iodine is no less than about 0.2% w/v.

10. The container of claim 1, wherein the iodide is provided by a source of water-soluble iodide ions selected from the group consisting of sodium iodide, potassium iodide, ammonium iodide, and combinations thereof.

11. The container of claim 10, wherein the antiseptic composition comprises between about 0.1% to 0.3% w/v of the source of water-soluble iodide ions.

12. The container of claim 1, wherein the concentration of povidone iodine and the concentration of iodide satisfy:

$$0.3x \leq y \leq 0.6x$$

wherein x is the concentration of povidone iodine, and y is the concentration of iodide.

13. The container of claim 1, wherein the antiseptic composition comprises between about 0.4 and 0.5% w/v of the povidone iodine.

14. The container of claim 1, wherein the buffered saline solution comprises sodium chloride and a buffer, wherein the buffer is sufficient to maintain a pH of the antiseptic composition between about 5.1 and 5.7 prior to gamma irradiation of the antiseptic composition.

15. The container of claim 14, wherein the buffer comprises sodium phosphate.

16. The container of claim 15, wherein the antiseptic composition comprises about 0.9% w/v sodium chloride and about 0.1 M sodium phosphate as the buffered saline solution.

17. The container of claim 1, wherein the container has been subjected to gamma irradiation sufficient to sterilize the antiseptic composition.

18. A method of sterilizing an antiseptic composition contained in a container, the method comprising:
    providing an antiseptic composition contained in a container, and
    sterilizing the antiseptic composition by subjecting the container to gamma irradiation, wherein:
    the antiseptic composition comprises:
       povidone iodine provided at a concentration above a minimum effective concentration of available iodine;
       iodide provided at a concentration sufficient to maintain the concentration of povidone iodine above the minimum effective concentration of available iodine upon gamma irradiation of the antiseptic composition;
       a nonionic surfactant; and
       a buffered saline solution;
    wherein the container comprises a headspace of less than about 25% of the volume of the container, and
    wherein the container is a squirt bottle.

19. The method according to claim 18, wherein the container comprises polypropylene.

* * * * *